US011971270B2

(12) United States Patent
Nakagawa

(10) Patent No.: US 11,971,270 B2
(45) Date of Patent: Apr. 30, 2024

(54) VEHICLE DRIVING SETTINGS CONTROL SYSTEM AND METHODS FOR OPERATING SAME

(71) Applicant: Toyota Motor Engineering & Manufacturing North America, Inc., Plano, TX (US)

(72) Inventor: Masashi Nakagawa, Sunnyvale, CA (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 210 days.

(21) Appl. No.: 17/066,176

(22) Filed: Oct. 8, 2020

(65) Prior Publication Data

US 2022/0113153 A1 Apr. 14, 2022

(51) Int. Cl.
*G01C 21/00* (2006.01)
*G01C 21/34* (2006.01)

(52) U.S. Cl.
CPC ..... *G01C 21/3484* (2013.01); *G01C 21/3415* (2013.01); *G01C 21/3461* (2013.01)

(58) Field of Classification Search
CPC ............ G01C 21/3461; G01C 21/3492; G01C 21/3415; G01C 21/3484
See application file for complete search history.

(56) References Cited

U.S. PATENT DOCUMENTS

| 6,351,698 | B1* | 2/2002 | Kubota | G01C 21/3608 704/E15.045 |
| 9,008,858 | B1* | 4/2015 | Payne | B60G 17/0195 701/1 |
| 2006/0015249 | A1* | 1/2006 | Gieseke | G08G 1/096872 340/995.19 |
| 2007/0261648 | A1* | 11/2007 | Reckels | F01P 7/167 123/41.12 |

(Continued)

FOREIGN PATENT DOCUMENTS

| CN | 106448226 A | 2/2017 |
| CN | 104791113 B | 6/2017 |

(Continued)

OTHER PUBLICATIONS

Operation principle of the predictive road condition services (https://www.bosch-mobility-solutions.com/en/products-and-services/passenger-cars-and-light-commercial-vehicles/automated-driving/predictive-road-condition-services/), accessed Jul. 20, 2020, 6 pages.

*Primary Examiner* — Vivek D Koppikar
*Assistant Examiner* — Jeffrey R Chalhoub
(74) *Attorney, Agent, or Firm* — Dinsmore & Shohl LLP

(57) ABSTRACT

A driving settings control system and method for controlling operating conditions of a vehicle component. The method includes determining a route to a destination in response to receiving the destination from the vehicle, identifying triggers along the route, determining operating conditions of one or more vehicle components of the vehicle corresponding to the triggers, and transmitting control instructions to (Continued)

the vehicle including the route, the operating conditions of the one or more vehicle components, and executing commands instructing the vehicle to accept the operating conditions of the one or more vehicle components as the vehicle approaches locations of the triggers.

18 Claims, 5 Drawing Sheets

(56) References Cited

U.S. PATENT DOCUMENTS

| | | | |
|---|---|---|---|
| 2013/0073143 A1* | 3/2013 | Miura | G06F 17/00 701/1 |
| 2013/0231841 A1* | 9/2013 | Rothschild | B60W 50/14 701/99 |
| 2014/0046585 A1* | 2/2014 | Morris, IV | G01C 21/00 701/400 |
| 2015/0094948 A1* | 4/2015 | Lu | G08G 1/0112 701/410 |
| 2016/0371977 A1* | 12/2016 | Wingate | G08G 1/096866 |
| 2017/0043789 A1* | 2/2017 | Hecht | G01C 21/3415 |
| 2017/0067750 A1* | 3/2017 | Day | G08G 1/096716 |
| 2017/0106855 A1* | 4/2017 | Lavoie | B60W 30/025 |
| 2017/0184409 A1* | 6/2017 | Glasgow | G08G 1/096816 |
| 2017/0262790 A1* | 9/2017 | Khasis | G08G 1/012 |
| 2018/0053415 A1* | 2/2018 | Krunic | G08G 1/0133 |
| 2018/0164108 A1* | 6/2018 | Rahal-Arabi | G01C 21/3484 |
| 2018/0340784 A1* | 11/2018 | Upadhyay | F01N 9/007 |
| 2019/0041228 A1* | 2/2019 | Singhal | G01C 21/3484 |
| 2019/0061526 A1 | 2/2019 | Park et al. | |
| 2019/0204107 A1* | 7/2019 | Glasgow | G01C 21/3484 |
| 2019/0325747 A1* | 10/2019 | Fleming | G01C 21/3484 |
| 2020/0056901 A1* | 2/2020 | Engle | G05D 1/0027 |

FOREIGN PATENT DOCUMENTS

| | | | | |
|---|---|---|---|---|
| CN | 208376694 U | 1/2019 | | |
| CN | 109733399 A | 5/2019 | | |
| CN | 110515379 A | 11/2019 | | |
| WO | WO-2011066468 A1 * | 6/2011 | | G01C 21/3469 |

* cited by examiner

VEHICLE DRIVING SETTINGS CONTROL SYSTEM AND METHODS FOR OPERATING SAME

TECHNICAL FIELD

The present specification generally relates to systems and methods for controlling a vehicle component based on a location of a known road condition and, more specifically, systems and methods for selecting a route to a destination to minimize changes in driving settings.

BACKGROUND

Conventional vehicle navigation systems are known to take into account traffic conditions such as congestion. In providing directions to a destination, alternative routes may be suggested based on these road conditions. Further, a user may be able to identify avoidances such as highways, tolls, bridges, and the like units permit routes to be selected based on. However, these systems do not take into consideration specific vehicle components and are not equipped to instruct a vehicle to adjust certain settings or operating conditions of these vehicle components based on detected road conditions.

Accordingly, a need exists for improved systems that determine a route to a destination based on changes to operating conditions of vehicle components and configured to adjust the operating conditions of the vehicle components at specific times.

SUMMARY

In one embodiment, a method for controlling a vehicle including determining a route to a destination in response to receiving the destination from the vehicle, identifying triggers along the route, determining operating conditions of one or more vehicle components of the vehicle corresponding to the triggers, and transmitting control instructions to the vehicle including the route, the operating conditions of the one or more vehicle components, and executing commands instructing the vehicle to accept the operating conditions of the one or more vehicle components as the vehicle approaches locations of the triggers.

In another embodiment, a driving settings control system includes a server including a map database and a controller. The map database includes locations of a plurality destinations and locations a plurality of triggers. The controller is configured to determine a route to a destination in response to receiving the destination from the vehicle, identify triggers along the route, determine operating conditions of one or more vehicle components of the vehicle corresponding to the triggers, and transmit control instructions to the vehicle including the route, the operating conditions of the one or more vehicle components, and executing commands instructing the vehicle to accept the operating conditions of the one or more vehicle components as the vehicle approaches locations of the triggers.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
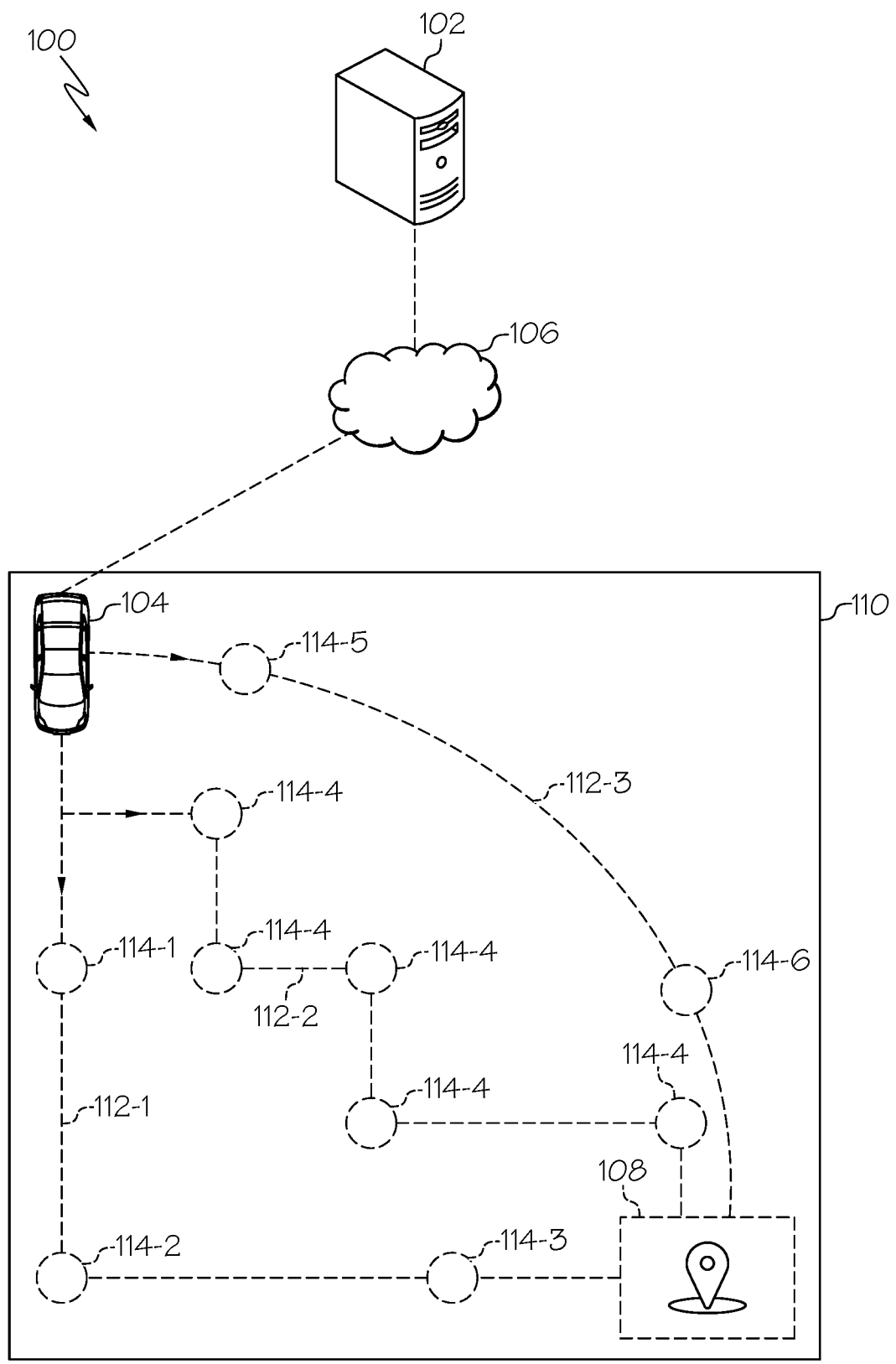
FIG. 1 schematically depicts a driving settings control system communicating with a vehicle depicted on a map according to one or more embodiments shown and described herein.

Embodiments described herein are directed to driving settings control systems and methods that include determining triggers along one or more routes to a destination and controlling operating conditions of a vehicle as the vehicle passes the triggers. The vehicle setting control systems include a server including a map database and a controller configured to determine a route to a destination in response to receiving the destination from the vehicle, identify triggers along the route, determine operating conditions of one or more vehicle components of the vehicle corresponding to the triggers, and transmit control instructions to the vehicle including the route, the operating conditions of the one or more vehicle components, and executing commands instructing the vehicle to accept the operating conditions of the one or more vehicle components as the vehicle approaches locations of the triggers.

Various embodiments of the driving settings control systems and operation of the driving settings control systems are described in more detail herein. Whenever possible, the same reference numerals will be used throughout the drawings to refer to the same or like parts.

Referring now to FIG. 1, a driving settings control system 100 is illustrated according to one or more embodiments described herein. The driving settings control system 100 is shown generally including a server 102 configured to communicate with a vehicle 104 via a network 106.

The server 102 may be a remote server such as a cloud server. In some embodiments, the server 102 may be a local server including, but not limited to, a roadside unit, an edge server, and the like. The server 102 may communicate with the vehicle 104 in an area covered by the server 102. The server 102 may communicate with other servers that cover different areas. The server 102 may communicate with a remote server and transmit information collected by the server 102 to the remote server.

The vehicle 104 may be an automobile or any other passenger or non-passenger vehicle such as, for example, a terrestrial, aquatic, and/or airborne vehicle including, but not limited, a bus, a scooter, a drone, and a bicycle. In some embodiments, the vehicle 104 may be an autonomous vehicle that navigates its environment with limited human input or without human input. More particularly, the vehicle 104 may include one or more components having settings or operating conditions that may be adjusted, either manually or automatically, in response to approaching or passing an associated road condition, referred to herein as a "trigger."

Referring still to FIG. 1, the vehicle 104 is depicted at a starting location of a map 110 and illustrates a plurality of routes 112, to a destination 108. In response to a navigation request being received from the vehicle 104 including the destination 108, the server 102 may generate the map 110 including the plurality of routes 112. The map 110 may be retrieved from a map database, which includes a plurality of maps, based on a starting location of the vehicle 104 when the navigation request is received from the vehicle 104 to the destination 108. The map 110 includes road data to determine at least one route from the starting location of the vehicle 104 to the destination 108. As shown, three routes 112-1, 112-2, 112-3, generally referred to herein as routes 112, are illustrated. However, it should be understood that more or fewer routes may be initially determined. Further, the map 110 illustrates a plurality of triggers 114 along each of the routes 112 based on the road data stored within the map database. The road data may be updated in real-time or substantially real-time in response to information being received from other vehicles or servers communicating changes on the road such as, for example, road closures, construction, increased traffic, and the like. This information may be utilized to update the presence of the triggers 114 along each of the routes 112.

As shown, the map 110 indicates one or more triggers 114 along each of the routes 112 that may result in the vehicle 104 adjusting the operating conditions of various components of the vehicle 104. For example, possible triggers 114 may include, but are not limited to, changes in elevation, such as hills, changes in road terrain, such as dirt roads, changes in road speed limit, road turns, wet roads, changes in amount of sunlight, and the like. Each of the triggers 114 may be associated with one or more components of the vehicle 104 including, but not limited to, suspension control, steering stability control sensitivity, shade control, damper, eco mode control, fuel injection control, and the like. As a non-limiting example, changes in elevation may be associated with adjusting fuel injection control of the vehicle 104, slow down points and/or changes in speed limits may be associated with activating the eco mode control of the vehicle 104, road turns may be associated with the suspension control, and wet roads may be associated with the steering stability control. It should be appreciated that the above examples are provided for exemplary purposes only and are not intended to limit the scope of the present disclosure.

As a non-limiting example, the map 110 indicates a plurality of triggers 114 on route 112-1 including a hill 114-1, a turn at a possible intersection 114-2, and increased traffic congestion 114-3, indicating a slow down point. Further, the map 110 indicates a plurality of triggers on route 112-2, wherein each of the triggers is an intersection 114-4. Lastly, the map 110 indicates a plurality of triggers on route 112-3, such as an on-ramp 114-5 to a highway and an off-ramp 114-6 from the highway. It should be appreciated that the specific triggers 114 discussed herein are not intended to be limiting, but discussed herein for exemplary purposes only. The server 102 is configured to analyze the number of triggers 114 along each route 112 and determine the effects of these triggers 114 on the operating conditions of the components of the vehicle 104. Thus, as discussed in more detail herein, one of the routes 112 will be selected as a route for navigating the vehicle 104 to the destination 108 based on which route 112 as the least effect on the vehicle 104 while driving to the destination 108, i.e., which route 112 results in the least changes to the operating conditions of the components of the vehicle 104. As shown, route 112-1 includes three triggers, route 112-2 includes five triggers, and route 112-3 has two triggers. In embodiments in which a binary determination is made to select the route 112 with the fewest number of triggers, route 112-3 would be selected. Alternatively, in embodiments, the selected route is based on driver preferences associated with a profile of the vehicle 104 and/or the driver of the vehicle 104. Thus, the effect of each trigger 114 on the vehicle 104 may be weighted differently than other triggers 114 to more appropriately select one of the routes 112 based on the particular driver driving the vehicle 104.

As described in more detail herein, the driving settings control system 100 is configured to instruct the vehicle 104 to adjust one or more settings or operating conditions of components of the vehicle 104 associated with a trigger 114 as the vehicle 104 approaches or passes the trigger 114. Further, in embodiments, the driving settings control system 100 is configured to select a route 112 that will result in the fewest number of changes to the components of the vehicle 104 while driving to the destination 108.

Figure 2:
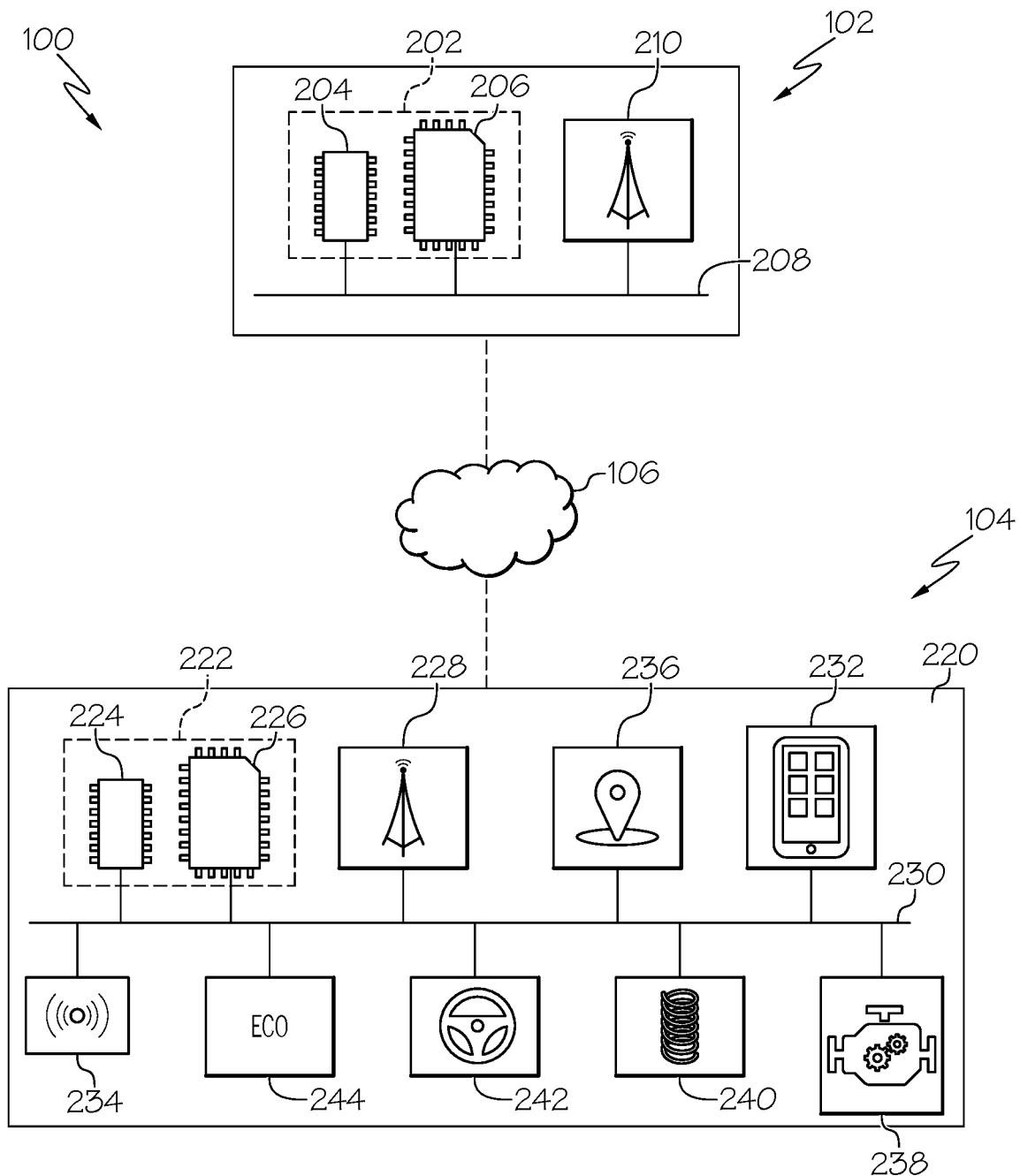
FIG. 2 schematically depicts a server system of the driving settings control system communicating with a vehicle system according to one or more embodiments shown and described herein.

FIG. 2 depicts a schematic diagram of the driving settings control system 100 including a server system 200 configured to communicate with a vehicle system 220, according to one or more embodiments shown and described herein. It is noted that, while the server system 200 and the vehicle system 220 are depicted in isolation, each of the server system 200 and the vehicle system 220 may be included within the server 102 and the vehicle 104 of FIG. 1, respectively.

The server system 200 includes a controller 202 including one or more processors 204 and one or more memory modules 206. Each of the one or more processors 204 may be any device capable of executing machine readable and executable instructions. Accordingly, each of the one or more processors 204 may be a controller, an integrated circuit, a microchip, a computer, or any other computing device. The one or more processors 204 are coupled to a communication path 208 that provides signal interconnectivity between various modules of the server system 200. Accordingly, the communication path 208 may communicatively couple any number of processors 204 with one another, and allow the modules coupled to the communication path 208 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 208 may be formed from any medium that is capable of transmitting a signal such as, for example, conductive wires, conductive traces, optical waveguides, or the like. In some embodiments, the communication path 208 may facilitate the transmission of wireless signals, such as WiFi, Bluetooth®, Near Field Communication (NFC) and the like. Moreover, the communication path 208 may be formed from a combination of mediums capable of transmitting signals. In one embodiment, the communication path 208 comprises a combination of conductive traces, conductive wires, connectors, and buses that cooperate to permit the transmission of electrical data signals to components such as processors, memories, sensors, input devices, output devices, and communication devices. Accordingly, the communication path 208 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

As noted above, the server system 200 includes one or more memory modules 206 coupled to the communication path 208. The one or more memory modules 206 may comprise RAM, ROM, flash memories, hard drives, or any device capable of storing machine readable and executable instructions such that the machine readable and executable instructions can be accessed by the one or more processors 204. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Still referring to FIG. 2, the server system 200 includes network interface hardware 210 for communicatively coupling the server system 200 to the vehicle system 220. The network interface hardware 210 can be communicatively coupled to the communication path 208 and can be any device capable of receiving and transmitting data via the network 106. Accordingly, the network interface hardware 210 can include a communication transceiver for sending and/or receiving any wired or wireless communication. For example, the network interface hardware 210 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 210 includes hardware configured to operate in accordance with the Bluetooth® wireless communication protocol. For example, the network interface hardware 210 of the server system 200 may receive a navigation request from the vehicle system 220 indicating a request to navigate the vehicle 104 to a destination. In response to the server system 200 receiving the navigation request and identifying a route to the destination, the server system 200 may transmit control instructions including navigation instructions to the vehicle system 220 as described herein.

Still referring to FIG. 2, the server system 200 may be communicatively coupled to the vehicle system 220 by the network 106. In one embodiment, the network 106 may include one or more computer networks (e.g., a personal area network, a local area network, or a wide area network), cellular networks, satellite networks and/or a global positioning system and combinations thereof. Accordingly, the server system 200 can be communicatively coupled to the network 106 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the vehicle system 220 includes a controller 222 including one or more processors 224 and one or more memory modules 226, network interface hardware 228, and a communication path 230 communicatively connected to the other components of the vehicle system 220. The components of the vehicle system 220 may be structurally similar to and have similar functions as the corresponding components of the server system 200 (e.g., the one or more processors 224 corresponds to the one or more processors 204, the one or more memory modules 226 corresponds to the one or more memory modules 206, the network interface hardware 228 corresponds to the network interface hardware 210, and the communication path 230 corresponds to the communication path 208).

The vehicle system 220 also includes a user interface 232 communicatively coupled to the other components of the vehicle system 220 via the communication path 230. The user interface 232 includes one or more controls for inputting and/or selecting a destination, such as destination 108. The destination may be selected by operating the one or more controls to enter a name or address of the destination. The one or more controls may be any suitable user operating controls such as, for example, buttons or tactile input on a touchscreen device. The user interface 232 of the vehicle system 220 may include a display for displaying navigation instructions received from the server system 200 for directing the vehicle 104 to the destination. The navigation instructions may include turn-by-turn directions toward the destination. Further, driving preferences may be selected and assigned a driver profile of the vehicle or the specific driver of the vehicle by operating the user interface 232. Thus, a user of the vehicle 104 may enter driving preferences by operating the controls of the user interface 232. The driving preferences may be associated with each individual vehicle component as discussed herein to identify driver-preferred operation conditions.

Referring still to FIG. 2, the vehicle system 220 may include one or more imaging devices 234 such as, for example, a camera. In some embodiments, the one or more imaging devices 234 may include one or more optical components, such as a mirror, fish-eye lens, or any other type of lens. In some embodiments, the one or more imaging devices 234 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the sensors described herein could include one or more LIDAR sensors, radar sensors, sonar sensors, or other types of sensors and that such data could be integrated into or supplement the data collection described herein. The one or more imaging devices 234 of the vehicle system 220 capture real-time road data while the vehicle is driving along the preferred route to determine or confirm when the settings of the components of the vehicle are to be adjusted. Further, in some embodiments, the imaging device may be utilized to update the map data in the map database in response to receiving road data from the vehicle system captured by the imaging device.

The vehicle system 220 includes a location sensor 236 communicatively coupled to the other components of the vehicle system 220 via the communication path 230. The location sensor 236 may be, for example, a GPS module, configured to capture location data indicating a location of the vehicle 104, which may be transmitted to the server system 200. The location data is utilized to correlate a road condition identified by the imaging device 234 with an associated trigger in the map database of the vehicle system 220 having a known location to confirm the location and/or presence of the trigger.

In embodiments, the vehicle system 220 includes an engine control module 238 communicatively coupled to the controller 222 of the vehicle system 220 via the communication path 230. The engine control module 238 is configured to adjust the operating conditions of an engine of the vehicle. For example, the engine control module 238 is configured to control the fuel injection of the engine of the vehicle 104 based on an elevation of the vehicle 104. For example, when the vehicle 104 is driving up a hill, the engine of the vehicle 104 will provide increased fuel injection to provide additional torque.

In embodiments, the vehicle system 220 includes a suspension control module 240 communicatively coupled to the controller 222 of the vehicle system 220 via the communication path 230. The suspension control module 240 may be configured to adjust the operating conditions of a vehicle suspension device such as, for example, the tires, springs, shock absorbers, linkages between the wheels, and the like. For example, the suspension control module 240 controls the suspension of the vehicle 104 when the vehicle 104 exhibits a hard turn or when driving over a rough terrain.

In embodiments, the vehicle system 220 includes a steering control sensitivity module 242 communicatively coupled to the controller 222 of the vehicle system 220 via the communication path 230. The steering control sensitivity module 242 may be configured to adjust a steering sensitivity of the vehicle 104. For example, the steering control sensitivity module 242 may be configured to decrease the steering stability sensitivity when driving over a wet road or over a rough terrain.

In embodiments the vehicle system 220 includes an eco mode control module 244 communicatively coupled to the controller 222 of the vehicle system 220 via the communication path 230. The eco mode control module 244 may be configured to activate or deactivate an eco mode of the vehicle 104. Eco mode control module 244 may be configured to utilize both a battery and the engine of the vehicle 104 simultaneously to improve electricity and/or gas utilization while driving. This may result in reducing air conditioning throughput and reducing the load on a compressor of the vehicle 104 to use less energy. The eco mode control module 244 may be configured to activate the eco mode when driving at reduced speeds and deactivate the eco mode when driving at high speeds, such as on a highway.

Figure 3:
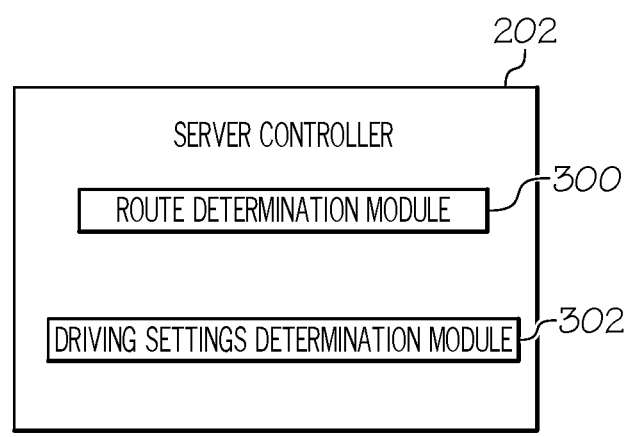
FIG. 3 schematically depicts a controller of the server system according to one or more embodiments shown and described herein.

Referring now to FIG. 3, the controller 202 of the server system 200 is shown with reference to the map 110 in FIG. 1. The controller 202 generally includes a route determination module 300 and a driving settings determination module 302. Each of the route determination module 300 and the driving settings determination module 302 may be a program module in the form of operating systems, application program modules, and other program modules stored in the controller 202. Such a program module may include, but is not limited to, routines, subroutines, programs, objects, components, data structures and the like for performing specific tasks or executing specific data types as will be described below. The route determination module 300 includes the map database which, in some embodiments, includes maps of different geographic areas identifying roads and destinations within each of the geographic areas. Further, the maps in the map database identify a plurality of triggers along each route, such as triggers 114 along routes 112, that indicate that operating conditions of a vehicle component to be adjusted as the vehicle 104 drives past each trigger. Each of the triggers 114 have an assigned location within the map, for example, geographic coordinates, such that it is possible to identify when the vehicle 104 is approaching the trigger, based on the location data captured by the location sensor 236 of the vehicle 104. As described herein, the location of the triggers 114 and the presence thereof may be updated based on information received from the vehicle 104, such as by the imaging devices 234, or other vehicles communicating with the server 102.

In response to receiving a navigation request from the vehicle 104 indicating the destination 108, the route determination module 300 is configured to identify one or more routes to the destination, such as routes 112 illustrated in FIG. 1. The route determination module 300 is further configured to identify the presence of one or more triggers 114 along each of the routes 112 and determine how many triggers are present along each route 112.

In embodiments in which more than one route 112 is identified, the routes 112 are assigned a score and ranked to give priority to the route 114 having the lowest score, i.e., the fewest number of triggers 114. In other embodiments, routes 112 may be assigned a higher score indicating that the route 112 has a fewer number of triggers and is thus a "higher" prioritized. In other embodiments, the triggers 114 may be weighted differently to provide a higher significance to those triggers 114 having a greater weight than other triggers 114 along the route 112. The differences in significance or weights may be dictated by the profile received from the vehicle 104 when receiving the navigation request. As discussed in more detail herein, certain triggers 114 along the routes 112 may be disregarded by the route determination module 300 in instances in which the vehicle 104 does not include a vehicle component corresponding to an identified trigger or, alternatively, in instances in which the driver profile indicates that certain triggers 114 should be disregarded. Once a route is identified has having the fewest number of triggers 114, or at least those triggers 114 which are considered relevant based on the driver profile, that route is determined to be the preferred route for purposes of sending navigation instructions to the vehicle 104.

The driving settings determination module 302 of the controller 202 is configured to identify which operating conditions of the vehicle components of the vehicle 104 should be adjusted, and to what extent, based on the presence of the identified triggers 114 in the selected route 112.

More particularly, the driving settings determination module 302 is configured to determine the degree and manner in which the operating conditions of the vehicle components should be adjusted based on the specific trigger. For example, the driving settings determination module 302 may instruct the steering control sensitivity module 242 to adjust the steering control sensitivity of the vehicle 104 based on how wet a portion of the road is at a location corresponding to a trigger. As another example, the driving settings determination module 302 may instruct the engine control module 238 to control the fuel injection of the engine of the vehicle 104 based on a specific degree of incline of a hill corresponding to a trigger. Although not disclosed in further detail herein, it should be appreciated that the driving settings determination module 302 may be configured to instruct each of the operating conditions of the vehicle components to be adjusted based on specific parameters of the triggers 114, not merely the presence thereof. In embodiments, the driving settings determination module 302 is configured to transmit control instructions to the vehicle 104 via the network 106. The control instructions include navigation instructions for the vehicle 104 to drive to the destination 108. The control instructions also include the operating commands instructing the vehicle 104 of how and when the operating conditions of the vehicle components should be adjusted.

Figure 4:
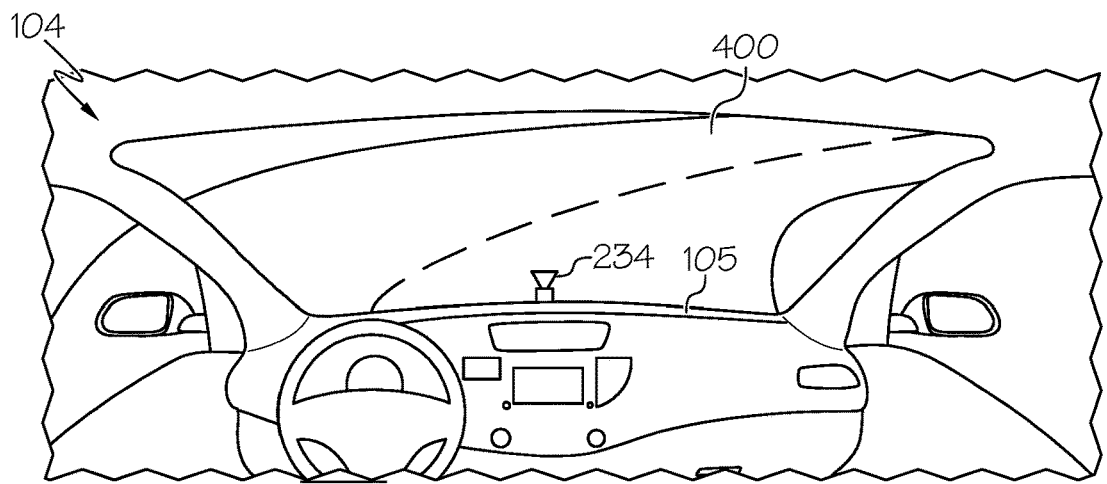
FIG. 4 schematically depicts a front view of an interior of the vehicle illustrating a road including a road condition according to one or more embodiments shown and described herein.
Figure 5:
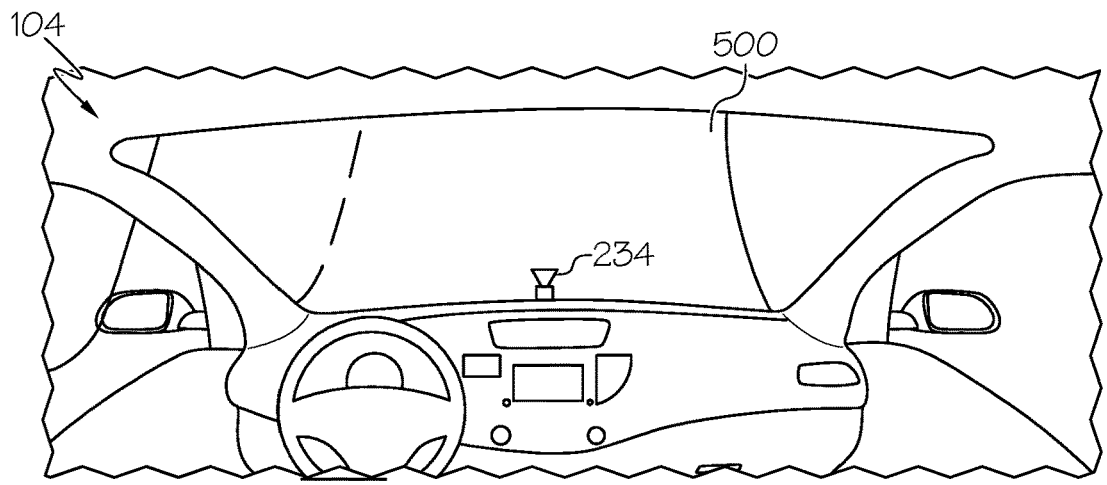
FIG. 5 schematically depicts a front view of an interior of the vehicle illustrating an alternative road including a road condition according to one or more embodiments shown and described herein.
Figure 6:
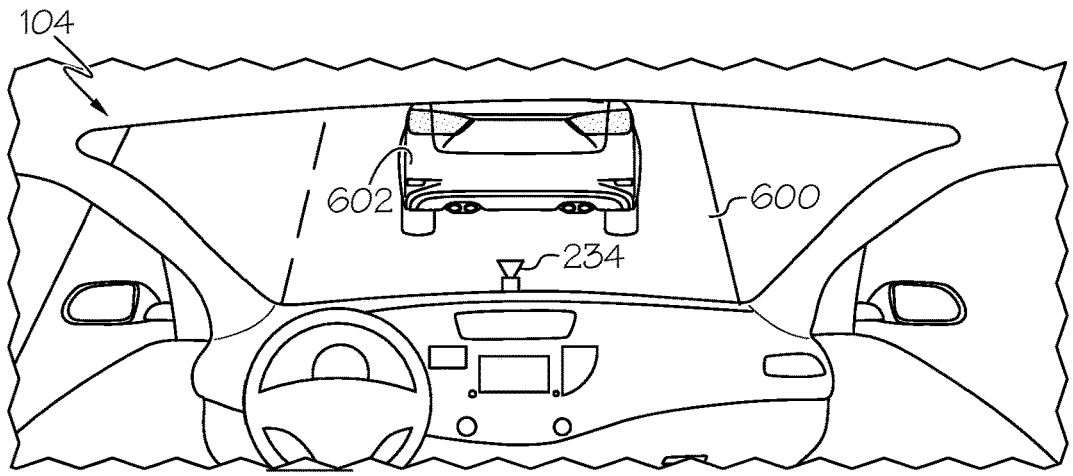
FIG. 6 schematically depicts a front view of an interior of the vehicle illustrating an alternative road including a road condition according to one or more embodiments shown and described herein.

Referring now to FIGS. 4-6 depict various examples of triggers that may be identified by the driving settings control system 100 for purposes of confirming a location and/or presence of the triggers and confirming when the operating conditions of the vehicle components should be adjusted. As a non-limiting example, FIG. 4 illustrates an interior view of the vehicle 104 including imaging device 234 directed in a vehicle-forward direction to capture an image of a road 400. While the imaging device 234 is illustrated on an instrument panel 105 of the vehicle 104, it should be appreciated that the imaging device 234 may be positioned at any suitable location of the vehicle 104, such as the front bumper, roof, and the like, to provide a field of view in the moving direction of the vehicle 104. Specifically, FIG. 4 illustrates the vehicle 104 approaching a right-hand turn on the road 400, similar to that which the vehicle 104 would exhibit when approaching the trigger 114-4 of route 112-2 as shown in FIG. 1. As the vehicle 104 approaches the right-hand turn, the imaging device 234 detects the road 400 curving to the right and transmits road data, including image data of the road 400, to the server 102, along with location data of the vehicle 104 captures by the location sensor 236, such that the presence and location of a corresponding trigger on the road 400 can be confirmed by the route determination module 300 by comparing the road data to associated trigger data of the map database. While the driving settings determination module 302 already transmits the executing commands to the vehicle 104 to adjust the operating conditions of the associated vehicle component, in this instance, by the suspension control module 240 and the steering control sensitivity module 242 of the vehicle 104, the imaging device 234 may be utilized to confirm the correct time to adjust the operating conditions of these vehicle components.

As another non-limiting example, FIG. 5 illustrates the vehicle 104 approaching and the imaging device 234 capturing an image of a road 500 including a hill, similar to that which the vehicle would exhibit at trigger 114-1 of route 112-1. Similar to the above example, the vehicle 104 may transmit road data of the road 500 to the route determination module 300 to confirm the location and/or presence of a corresponding trigger on the route and confirm that the operating conditions of the vehicle component should be adjusted. In this particular example, the engine control module 238 may adjust the operating conditions of the engine when approaching the hill.

As another non-limiting example, as shown in FIG. 6, the vehicle 104 is illustrated within a threshold distance of a front vehicle 602 on a road 600. When the imaging device 234 identifies the front vehicle 602 within the threshold distance of the vehicle 104, this may confirm a slow down point or location of high traffic and congestion. In response, road data captured by the imaging device 234 may be used to confirm the location and/or presence of a slow down point in the map database and adjust the operating conditions of a vehicle component such as, for example, activating the eco mode of the vehicle 104 by the eco mode control module 244. It should be appreciated that the examples described herein, as illustrated in FIGS. 4-6, are only intended for illustrative purposes only and are not intended to limit the scope of the present disclosure. Further, it is to be understood that the operating conditions of the particular vehicle components are adjusted based on the instructions in the executing commands sent to the vehicle 104 from the server 102, specifically the driving settings determination module 302. As such, in embodiments, the imaging device 234 is utilized only for purposes of confirming the precise time at which the operating conditions of the vehicle components are to be adjusted and for confirming the location and/or presence of the trigger in the map database.

Figure 7:
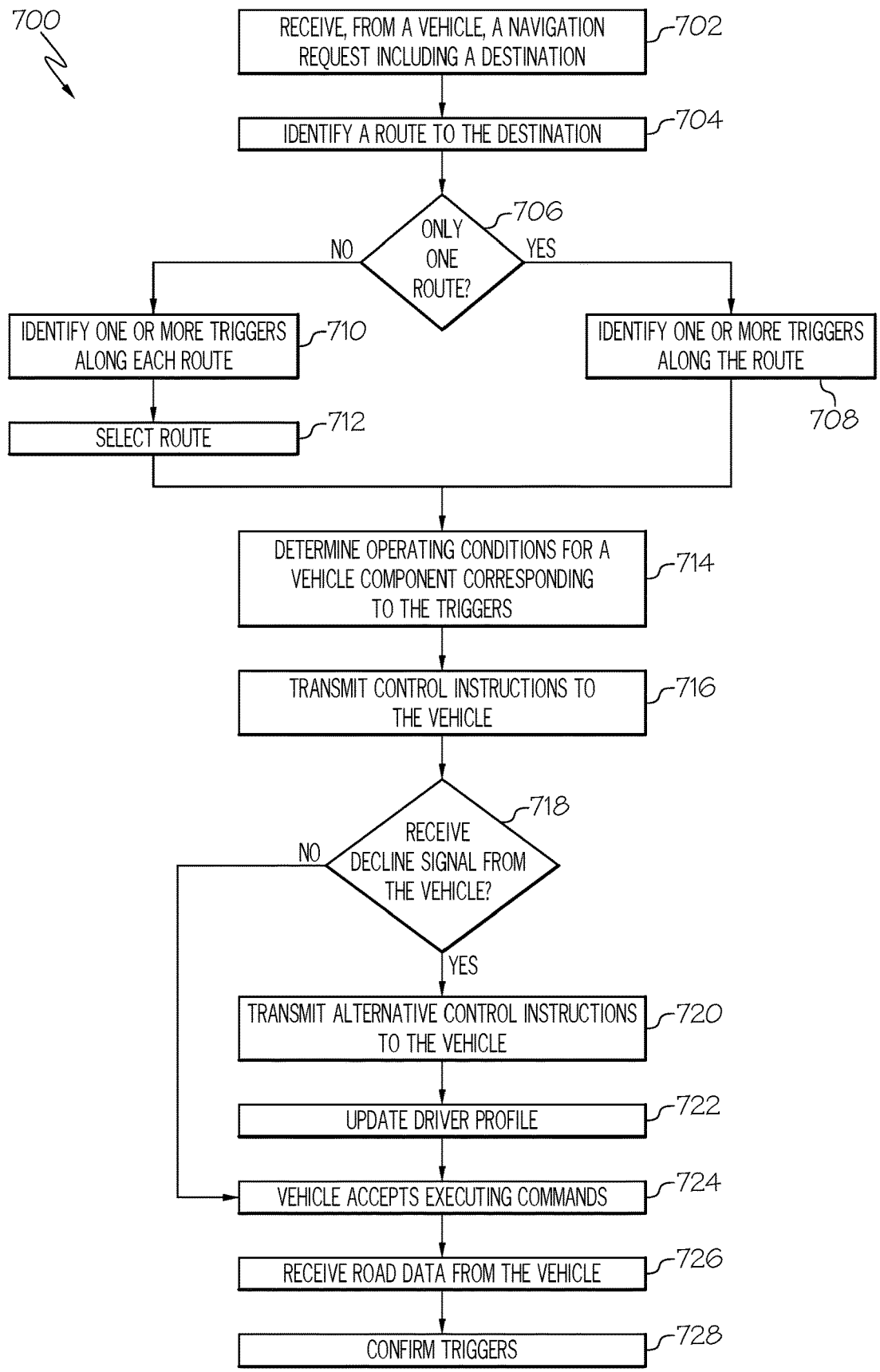
FIG. 7 schematically depicts a flowchart of a method for determining a route to a destination and operating the vehicle, according to one or more embodiments shown and described herein.

FIG. 7 depicts a method 700 for determining a route from a plurality of routes, transmitting navigation instruction to a vehicle to arrive at a destination, and adjusting operating conditions of components of the vehicle based on triggers identified along the route according to one or more embodiments shown and described herein. The method 700 is described herein with reference to FIGS. 1-3.

Initially, at step 702, the server 102 receives a navigation request from the vehicle 104 including the destination 108. The destination 108 may be identified by a name or address of associated with the destination 108. As noted above, navigation request also includes location data of the vehicle 104 captured by the location sensor 236 of the vehicle 104 at the time the navigation request is transmitted to the server 102.

At step 704, the route determination module 300 selects the map 110 from the map database including the location of the vehicle 104 and the location of the destination 108. The route determination module 300 then identifies one or more routes 112 from the vehicle 104 to the destination 108. The routes 112 are identified by known road segments on the map 110. Thus, the routes 112 are formed by interconnecting individual road segments to create each route 112 from the vehicle 104 to the destination 108. In embodiments, the routes 112 may be identified based on driving preferences received from the vehicle 104 with the navigation request. For example, the driving preferences may indicate a requirement that certain triggers, such as rough terrain, a highway, or the like, should be avoided. In this case, routes 112 includes such triggers will be disregarded.

At step 706, a determination is made as to whether there is only one route 112 identified by the route determination module 300 or if a plurality of routes 112 are identified. If only one route 112 is identified, the route 112 is selected to be transmitted to the vehicle 104 and the method 700 proceeds to step 708 where the route determination module 300 identifies the location of one or more triggers 114 along the route 112.

At step 708, the route determination module 300 identifies each trigger 114 along the route 112 and an associated location of each trigger 114. Alternatively, if a determination is made at step 706 that more than one route 112 is identified, then the method 700 proceeds to step 710. At step 710, the route determination module 300 identifies each trigger 114 along the routes 112 and an associated location of each trigger 114, similar to that performed at step 708.

At step 712, as described above, the route determination module 300 assigns a score to each route 112 based on the number of triggers 114 identified along each route 112. In embodiments, the route determination module 300 disregards certain triggers 114 when determining the score of the routes 112. These disregarded triggers may be based on the driver profile including driver preferences received within the initial navigation request from the vehicle 104. Thereafter, the route determination module 300 selects the route 112 from the plurality of routes 112 based on the score in the manner described herein. In embodiments, the route 112 having the lowest score is selected as the route 112 to be transmitted to the vehicle 104.

At step 714, the driving settings determination module 302 determines operating conditions for adjusting each vehicle component of the vehicle 104 corresponding to the identified triggers 114. Specific example are discussed herein as to which vehicle components should be adjusted based on corresponding trigger identified. For example, triggers corresponding to changes in elevation may be associated with adjusting fuel injection control of the vehicle 104, slow down points and/or changes in speed limits may be associated with activating the eco mode control of the vehicle 104, road turns may be associated with the suspension control, and wet roads may be associated with the steering stability control.

At step 716, the driving settings determination module 302 transmits control instructions to the vehicle 104. The control instructions may include the route 112, specifically navigation instructions along the route 112 to the destination 108, the operating conditions of the one or more vehicle components, and executing commands instructing the vehicle 104 to accept the operating conditions of the one or more vehicle components as the vehicle 104 approaches a location of the each trigger 114.

In some embodiments, a driver, or some other passenger or occupant, of the vehicle 104 may be permitted to decline the control instructions, or specifically the executing commands, from the server 102 by operating the user interface 232 of the vehicle 104. As a non-limiting example, the driver of the vehicle 104 may operate the user interface 232 of the vehicle 104 to decline the route 112 selected by the server 102. If the server 102 receives a decline signal from the vehicle 104 at step 718, the method 700 proceeds to step 720 in which the route determination module 300 will identify an alternative route for the vehicle 104. In some embodiments, the next route of the plurality of routes 112 according to the priority ranking of the routes 112 may be selected and transmitted to the vehicle 104.

At step 722, the driver profile of the vehicle 104 may be updated based on the specific route 112 being declined. In some embodiments, the driving settings determination module 302 may utilize machine learning to identify specific triggers 114 present along the declined route and adjust the profile accordingly. Specifically, the driver profile may weight certain triggers present along the declined route less favorably for future selection of a route.

If the server 102 does not receive the decline signal from the vehicle 104 at step 718, the method 700 proceeds to step 724 in which the vehicle 104 accepts the executing commands and implements the operating conditions of the vehicle components as the vehicle 104 approaches or passes a location along the route 112 corresponding to each trigger 114.

As discussed above with respect to FIGS. 4-6, at step 726, the vehicle 104 captures road data including image data at a location corresponding to the trigger 114 and the vehicle 104 transmits the road data to the server 102. The server 102 then receives the road data at step 728 and processes the road data to confirm the location and/or presence of the trigger 114 as predicted. If the road data does not confirm the location of the trigger 114, the map database is updated to reflect that the trigger 114 is no longer present or, alternatively, that the location was incorrect. As a non-limiting example, the road data captured by the imaging device 234 of the vehicle 104 may indicate that a trigger 114 corresponding to a slow down point due to vehicle congestion or construction is no longer present and the trigger 114 may be removed from the map database. Further, the road data may be useful for confirming a location of the vehicle 104 and instructing the vehicle 104 to adjust the operating commands of a vehicle component corresponding to the trigger 114 more accurately.

From the above, it is to be appreciated that defined herein are driving settings control systems and methods for determining one or more routes to a destination, identifying triggers along the route, determining operating conditions of one or more vehicle components of the vehicle corresponding to the triggers, and transmitting control instructions to the vehicle including the route, the operating conditions of the one or more vehicle components, and executing commands instructing the vehicle to accept the operating conditions of the one or more vehicle components as the vehicle approaches locations of the triggers.

While particular embodiments have been illustrated and described herein, it should be understood that various other changes and modifications may be made without departing from the scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for controlling a vehicle, the method comprising:
    determining a route to a destination in response to receiving the destination from the vehicle;
    identifying a first trigger and a second trigger along the route;
    determining an operating condition of a first vehicle component of the vehicle corresponding to the first trigger and an operating condition of a second vehicle component of the vehicle corresponding to the second trigger;
    transmitting control instructions to the vehicle including the route, the operating condition of the first vehicle component, the operating condition of the second vehicle component, and executing commands, the executing commands instructing the vehicle to accept the operating condition of the first vehicle component as the vehicle approaches a location of the first trigger and accept the operating condition of the second vehicle component as the vehicle approaches a location of the second trigger; and
    automatically adjusting the operating conditions of the first vehicle component of the vehicle in response to the vehicle approaching the location of the first trigger such that the operating conditions of the first vehicle component is adjusted at the first trigger, wherein the operating condition of the first vehicle component is torque control and the first trigger is a change in elevation along the route, the operating condition of the second vehicle component is a driving mode and the second trigger is a slow down point along the route.

2. The method of claim 1, further comprising identifying a plurality of routes to the destination in response to receiving the destination from the vehicle.

3. The method of claim 2, further comprising selecting one of the plurality of routes as the route to be transmitted to the vehicle.

4. The method of claim 3, wherein the selecting one of the plurality of routes comprises selecting the route based on the number of triggers along each of the plurality of routes.

5. The method of claim 3, further comprising:
receiving a driver profile including driver preferences; and
selecting the route to be transmitted to the vehicle based on the driver preferences.

6. The method of claim 5, further comprising:
receiving a decline signal from the vehicle declining the route;
selecting an alternative route of the plurality of routes; and
transmitting alternative control instructions to the vehicle including the alternative route.

7. The method of claim 6, further comprising, in response to receiving the decline signal from the vehicle, updating the one or more driver preferences of the driver profile.

8. The method of claim 1, further comprising:
receiving image data from the vehicle as the vehicle drives along the route;
confirming the first trigger and the second trigger based on the image data; and
updating a map database based on the image data.

9. A driving settings control system comprising:
a server comprising:
a map database including locations of a plurality destinations and locations a plurality of triggers; and
a controller,
wherein the controller is configured to:
determine a route to a destination in response to receiving the destination from a vehicle;
identify a trigger along the route;
determine an operating condition of a vehicle component of the vehicle corresponding to the trigger;
transmit control instructions to the vehicle including the route, the operating condition of the vehicle component, and executing commands instructing the vehicle to accept the operating condition of the vehicle component in response to receiving data from a sensor on the vehicle while traveling along the route, the data indicating that the vehicle is approaching a location of the trigger; and
automatically adjust the operating conditions of the first vehicle component of the vehicle in response to the vehicle approaching the location of the first trigger such that the operating conditions of the first vehicle component is adjusted at the first trigger,
wherein the operating condition of the first vehicle component is torque control and the first trigger is a change in elevation along the route, the operating condition of the second vehicle component is a driving mode and the second trigger is a slow down point along the route.

10. The driving settings control system of claim 9, wherein the controller is configured to:
identify a plurality of routes to the destination in response to receiving the destination from the vehicle.

11. The driving settings control system of claim 10, wherein the controller is configured to:
select one of the plurality of routes as the route to be transmitted to the vehicle.

12. The driving settings control system of claim 11, wherein the controller is configured to:
select the route to be transmitted to the vehicle based on a plurality of triggers along each of the plurality of routes.

13. The driving settings control system of claim 9, wherein the vehicle component is selected from the group consisting of suspension, stability control sensitivity, shade control, damper, driving mode, and fuel injection mapping.

14. The driving settings control system of claim 9, wherein the trigger is selected from the group consisting of changes in elevation, changes in road terrain, changes in road speed limit, and road turn.

15. The driving settings control system of claim 11, wherein the controller is configured to:
receive a driver profile including driver preferences; and
select the route to be transmitted to the vehicle based on the driver preferences.

16. The driving settings control system of claim 15, wherein the controller is configured to:
receive a decline signal from the vehicle declining the route;
select an alternative route of the plurality of routes; and
transmitting alternative control instructions to the vehicle including the alternative route.

17. The driving settings control system of claim 16, wherein the controller is configured to:
in response to receiving the decline signal from the vehicle, update the one or more driver preferences of the driver profile.

18. The driving settings control system of claim 9, wherein the controller is configured to:
receive image data from the vehicle as the vehicle drives along the route;
confirm the trigger based on the image data; and
update the map database based on the image data.

* * * * *

UNITED STATES PATENT AND TRADEMARK OFFICE
CERTIFICATE OF CORRECTION

PATENT NO. : 11,971,270 B2
APPLICATION NO. : 17/066176
DATED : April 30, 2024
INVENTOR(S) : Masashi Nakagawa It is certified that error appears in the above-identified patent and that said Letters Patent is hereby corrected as shown below:

In the Specification

In Column 11, Line(s) 25, after "Specific", delete "example" and insert --examples--, therefor.

Signed and Sealed this
Fourth Day of June, 2024

Katherine Kelly Vidal
*Director of the United States Patent and Trademark Office*